US011457019B2

(12) United States Patent
Barker et al.

(10) Patent No.: US 11,457,019 B2
(45) Date of Patent: Sep. 27, 2022

(54) ACCESS CONTROL AUTHENTICATION SCHEME BASED ON CONTINUOUS AUTHENTICATION

(71) Applicant: International Business Machines Corporation, Armonk, NY (US)

(72) Inventors: Madeleine Eve Barker, Atlanta, GA (US); Cesar Augusto Rodriguez Bravo, Alajuela (CR); Jeremy R. Fox, Georgetown, TX (US); Zachary A. Silverstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 16/406,123

(22) Filed: May 8, 2019

(65) Prior Publication Data

US 2020/0358787 A1 Nov. 12, 2020

(51) Int. Cl.
*H04L 29/06* (2006.01)
*H04L 9/40* (2022.01)

(52) U.S. Cl.
CPC ........ *H04L 63/123* (2013.01); *H04L 63/0861* (2013.01)

(58) Field of Classification Search
CPC .................... H04L 63/123; H04L 63/0861
See application file for complete search history.

(56) References Cited

U.S. PATENT DOCUMENTS

| 5,229,764 A | 7/1993 | Matchett |
| 5,311,596 A | 5/1994 | Scott |
| 8,660,322 B2 | 2/2014 | Tsai |
| 8,990,889 B2 * | 3/2015 | Van Till ............... H04L 63/0853 726/2 |
| 2007/0107050 A1 | 5/2007 | Selvarajan |
| 2007/0252001 A1 | 11/2007 | Kail |
| 2013/0343616 A1 * | 12/2013 | Forero .................... G06F 21/32 382/115 |
| 2014/0283016 A1 * | 9/2014 | Sambamurthy ......... G06F 21/31 726/19 |
| 2015/0242601 A1 * | 8/2015 | Griffiths .................. G06F 21/31 726/5 |
| 2015/0242605 A1 * | 8/2015 | Du .......................... G06F 21/31 726/7 |

(Continued)

FOREIGN PATENT DOCUMENTS

WO  2016177669 A1  11/2016

OTHER PUBLICATIONS

Deutschmann et al., "Continuous Authentication Using Behavioral Biometrics," IT Pro Jul./Aug. 2013, pp. 12-15.

(Continued)

*Primary Examiner* — Jeffrey C Pwu
*Assistant Examiner* — William A Corum, Jr.
(74) *Attorney, Agent, or Firm* — Stephen R. Yoder

(57) ABSTRACT

In an approach for an access control system, a processor verifies an identity of a user in specified time intervals based on a first device associated with the user. A processor sends a validation token to a cloud-based system and updates a record associated with the user in the cloud-based system. A processor, in response to an attempt to access a secure area, transmits the validation token to a second device. A processor verifies the validation token by the second device with the cloud-based system.

8 Claims, 6 Drawing Sheets

(56) References Cited

U.S. PATENT DOCUMENTS

| | | | | |
|---|---|---|---|---|
| 2016/0182503 | A1* | 6/2016 | Cheng | G06F 21/316 726/7 |
| 2017/0046892 | A1* | 2/2017 | Masters | G07C 9/00571 |
| 2018/0007553 | A1* | 1/2018 | Dutt | G06F 21/316 |
| 2018/0089916 | A1* | 3/2018 | Drako | H04W 4/021 |
| 2018/0262891 | A1* | 9/2018 | Wu | H04W 4/00 |
| 2018/0302416 | A1* | 10/2018 | Einberg | G07C 9/00174 |
| 2018/0309792 | A1* | 10/2018 | Obaidi | G06F 21/32 |
| 2019/0357050 | A1* | 11/2019 | Kennedy-Foster | H04L 63/0853 |
| 2020/0314651 | A1* | 10/2020 | Pirch | G06F 12/1458 |

OTHER PUBLICATIONS

Frank, et al. "Touchalytics: On the Applicability of Touchscreen Input as a Behavioral Biometric for Continuous Authentication." IEEE transactions on Information Forensics and Security, vol. 8, Issue 1, 2013, pp. 136-148, <http://www.mariofrank.net/touchalytics/index.html>.

Liu, et al. "Optimal combined intrusion detection and biometric-based continuous authentication in high security mobile ad hoc networks." IEEE transactions on Wireless Communications, vol. 8, Issue 2, 2009, pp. 806-815.

Niinuma et al.. "Soft Biometric Traits for Continuous User Authentication." IEEE Transactions on Information Forensics and Security, vol. 5, No. 4, Dec. 2010, pp. 771-780.

Patel, et al. "Continuous User Authentication on Mobile Devices: Recent Progress and Remaining Challenges." IEEE Signal Processing Magazine, Jul. 2016, pp. 49-61.

Ritchie et al., "The Future of authentication: Biometrics, multi-factor, and co-dependency", iMore, Apr. 18, 2019—11:10 EST.

Tsai et al. "Interactive Artificial Bee Colony Supported Passive Continuous Authentication System." IEEE Systems Journal, vol. 8, Issue 2, 2014, pp. 395-405.

Mufandaidza et al., "Continuous User Authentication in Smartphones using gait analysis", Proceedings of the IECON 2018—44th Annual Conference of the IEEE Industrial Electronics Society, Oct. 20-23, 2018, Washington, D.C., USA, 6 pages.

Wu et al., "Smartphone continuous authentication based on keystroke and gesture profiling", Proceedings of the 2015 International Carnahan Conference on Security Technology (ICCST), Sep. 21-24, 2015, Taipei, Taiwan, 17 pages.

Mell et al., "The NIST Definition of Cloud Computing", Recommendations of the National Institute of Standards and Technology, Special Publication 800-145, Sep. 2011, 7 pages.

* cited by examiner

ACCESS CONTROL AUTHENTICATION SCHEME BASED ON CONTINUOUS AUTHENTICATION

BACKGROUND

The present disclosure relates generally to the field of authentication, and more particularly to access control authentication.

In the fields of physical security and information security, access control is the selective restriction of access to a place or other resource. The act of accessing may mean consuming, entering, or using. Authorization may be a permission to access a place or other resource. Geographical access control may be enforced by personnel or with a device. Radio-frequency identification (RFID) uses electromagnetic fields to automatically identify and track tags attached to objects. The tags contain electronically stored information.

SUMMARY

Aspects of an embodiment of the present disclosure disclose an approach for an access control system. A processor verifies an identity of a user in specified time intervals based on a first device associated with the user. A processor sends a validation token to a cloud-based system and updates a record associated with the user in the cloud-based system. A processor, in response to an attempt to access a secure area, transmits the validation token to a second device. A processor verifies the validation token by the second device with the cloud-based system.

DETAILED DESCRIPTION

The present disclosure is directed to systems and methods for using an access device as a form of continuous authentication verification for a user in possession of it to access a security area. Continuous authentication verification may include periodic or intermittent authentication verification, for example, in specified time intervals.

Many offices or other locations utilize radio frequency identification (RFID) badges as a form of verification of users. There are inherent risks with RFID including cloning and duplicating the badges, simple swiping of badges, and even simple risks like ease of losing a badge. An issue related to this is the fact that the verification of the badge usually is only at a single point of time: the scanning of the badge at the reader. The present disclosure recognizes a solution that can verify users with confidence, allow them to pass through security systems and ensure that whoever is badging in is who they claim to be.

The continuous authentication verification focuses not only on the actual authentication but also the "conversation" between a continuously authenticated user, an access device (e.g., a mobile device), and an access control system. The access device facilities the conversation and authentication verification among the user, the access device and the access control system. By combining the access device, as a form of "always on" authentication and passing that authenticated token to the access control system, a greater amount of confidence is added that the user is who they are badging in as. Utilizing an access device, as a middleman to continuously authenticate with a cloud-based validation system and to pass a validation token between an external physical system and an authentication module ensures user veracity.

Figure 1:
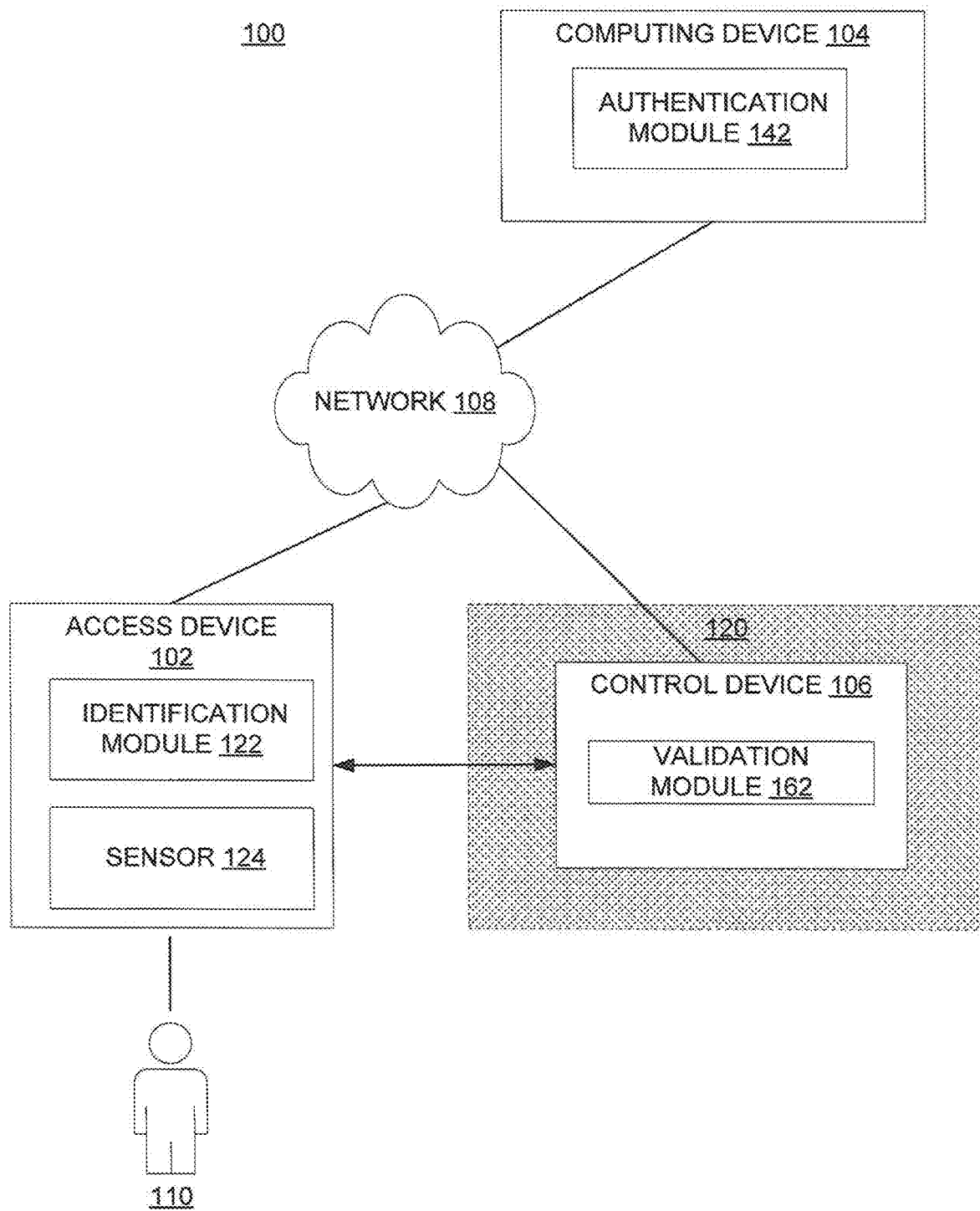
FIG. 1 is a functional block diagram illustrating an access control environment, in accordance with an embodiment of the present disclosure.

The present disclosure will now be described in detail with reference to the Figures. FIG. 1 is a functional block diagram illustrating an access control environment, generally designated 100, in accordance with an embodiment of the present disclosure.

Access control environment 100 includes an access device 102, a computing device 104, a control device 106, and a network 108. The access device 102 is any device that includes an interface which the user 110 may interact with. In an embodiment, the user 110 is in possession of the access device 102. The user 110 may be an active entity that requests access to a secure area 120 whose access is secured by the control device 106. The user 110, for example, can be a person, a program, a process, or any other subject that requests access to the secure area 120 secured by the control device 106. The secure area 120 can be a physical security area such as a campus, a building, an office, a room, a physical information technology asset or any area that is physically secured by the control device 106. The secure area 120 can also be an information security area such as information or data whose access is secured by the control device 106.

In an embodiment, the user 110 registers the access device 102 with the authentication module 142 for a cloud authentication method for the secure area 120. In one embodiment, the authentication module 142 is a cloud-based system. Authentication module 142 stores the user's 110 habit information in an encrypted format on the cloud. The user 110 can disable this feature or have to opt in to have their habit information be obtained. The user 110 is in control of what type of information is going to be collected and aware of how that information is going to be used. In an embodiment, the user 110 is notified when the data collection of the user's 110 habit is being collected. In another example, the user 110 can easily select the use of the user's fingerprint but can dis-allow the use of the user's GPS or turn the user's microphone on. As the user 110 interacts normally the access device 102, the habits of the user 110 are captured. Such habits for continuous authentication for the user 110 can include the user's 110 typing pattern, pressure applied to a keyboard, and walking path to the secure area 120. In an embodiment, these details of the habits of the user 110 are stored on the authentication module 142. As the user 110 does this over a period of time (e.g., days, weeks), the authentication module 142 increases a confidence parameter in these patterns for the user 110. The access device 102 transfers a validation token to the control device 106 to access the secure area 120. The control device 106 then queries the authentication module 142 looking for a valid recent issuance of the token. If the token was last issued within a certain period, for example, 15 minutes, and the token matches up with the registered token with the authentication module 142, the authentication module 142 confirms the verification of the token to the control device 106. The control device 106 grants access to the user 110 to the secure area 120. In one embodiment, the control device 106 grants access to the user 100 for a physical security access to the secure area 120. In another embodiment, the control device 106 grants access to the user 100 for an information security access to the secure area 120.

For example, the access device 102 may track interaction habits of the user 110 with the access device 102, and the context of the access device 102, such as details including fingerprint, biometric, walk gait, eye scan, facial scan, typing pressure, and voice.

In an embodiment as depicted in FIG. 1, the access device 102 includes a sensor 124 and an identification module 122. In the depicted embodiment, the sensor 124 and the identification module 122 are located on the access device 102. However, in other embodiments, the sensor 124 and the identification module 122 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between the access device 102, the sensor 124 and the identification module 122, in accordance with a desired embodiment of the disclosure.

The sensor 124 may detect identification information of the user 110. The identification information may be biometric information of the user 110. The biometric information may be physiological characteristic information. Physiological characteristic information is generally related to the shape of the user 110. The physiological characteristic information may include, but not limited to, fingerprint, signature dynamics, palm veins, face recognition, DNA, palm print, hand geometry, hand topography, iris recognition, retina, odor and scent. The biometric information may be behavioral characteristic information. Behavioral characteristic information is generally related to the pattern of behavior of the user 110. The behavioral characteristic information may include, but is not limited to, typing rhythm, typing pressure, keyboard dynamics, text habit, voice, walk gait, and global positioning system (GPS) commute path. In an embodiment, the sensor 124 is located on the access device 102. However, in other embodiments, the sensor 124 may be located externally and accessed through a communication network such as network 108.

The identification module 122 is configured to verify an identity of the user 110 in specified time intervals based on the access device 102 respectively associated with the user 110. In an embodiment, the specified time intervals can be pre-determined or scheduled time intervals. In another embodiment, the specified time intervals can be time intervals based on the activities of the user 110 using the access device 102. Verifying the identity of the user 110 can be based on a historical usage pattern of the access device 102 and biometric information collected from the user 110. The user 110 can disable this feature or have to opt in to have their historical usage pattern and biometric information be obtained. The user 110 is in control of what type of information is going to be collected and aware of how that information is going to be used. In an embodiment, the user 110 is notified when the data collection of the user's 110 habit is being collected. In another example, the user 110 can easily select the use of the user's fingerprint but can disallow the use of the user's GPS or turn the user's microphone on.

The identification module 122 is further configured to send a validation token to the authentication module 142 and to transmit instructions to the authentication module 142 to update a record associated with the user 110 based on the validation token and the updated and verified identification information of the user 110. The record is associated with the user 102. The record can include a historical usage pattern of how the user 110 uses the access device 102. The record can also include identification information of the user 110. The validation token, for example, may include a password, a biometric scan, a key, a hidden path, a social barrier, or any other authentication method that may give the user 110 an access to the secure area 120 secured by the control device 106.

In response to an attempt to access a secure area 120 secured by the control device 106, the identification module 122 transmits the validation token to the control device 120. When the control device 106 receives the validation token, the control device 106 communicates the authentication module 142 and verifies the validation token received from the access device 102 matches the record associated with the user 110 in the authentication module 142. If the validation token matches the record associated with the user 110 in attempting to access the secure area 120, the control device 106 grants access to the user 110.

In an embodiment, the user 110 uses the access device 102 in a normal pattern. The identification module 122 runs, for example, every 15 minutes on the past interactions and context to determine if the pattern matches the normal interaction pattern of the user 110. The identification module 122 sends a verification to the authentication module 142 in the computing device 104 of a successful scan. The authentication module 142 verifies that a successful scan runs on the access device 102 and issues a validated token to the access device 102. When the user 110, having the access device 102, approaches and requests to access a secure area 120 secured by the control device 106, the user 110 scans the access device 102. The control device 106 receives a token, checks the authentication module 142, finds the token, and allows the user 110 to access the area secured by the control device 106. Access device 102 may include components, as depicted and described in further detail with respect to FIG. 4.

In an embodiment, the access device 102 is a mobile device. Access device 102 may be a laptop computer, a netbook computer, a tablet computer, a personal digital assistant (PDA), a GPS device, a smart phone, or a cell phone. In general, access device 102 may be any electronic device or computing system capable of sending and receiving data and identification information, and communicating with user 110, computing device 104 and control device 106 directly and or over network 108. Access device 102 may include components, as depicted and described in further detail with respect to FIG. 4.

In various embodiments of the present disclosure, the computing device 104 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, the computing device 104 represents a computing system utilizing clustered computers and components to act as a single pool of seamless resources. In general, the computing device 104 can be any computing device or a combination of devices with access to authentication module 142 and network 108 and is capable of processing program instructions and executing authentication module 142, in accordance with an embodiment of the present disclosure. In one embodiment, the computing device 104 is a cloud-based system. The computing device 104 may include internal and external hardware components, as depicted and described in further detail with respect to FIG. 4.

Further, in the depicted embodiment, the computing device 104 includes an authentication module 142. In the depicted embodiment, the authentication module 142 is located on computing device 104. However, in other embodiments, the authentication module 142 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between the computing device 104 and the authentication module 142, in accordance with a desired embodiment of the disclosure.

Authentication module 142 is configured to register the access device 102 associated with the user 110 for a record to access the secure area 120 secured by the second device 106. The record is associated with the user 110. The record can include a historical usage pattern of how the user 110 uses the access device 102. The record can also include identification information of the user 110.

Authentication module 142 is further configured to receive a validation token in specified time intervals based on verification of an identity of the user 110 from the access device 102. In an embodiment, the specified time intervals can be pre-determined or scheduled time intervals. In another embodiment, the specified time intervals can be time intervals based on the activities of the user 110 while using the access device 102. Verifying the identity of the user 110 can be based on a historical usage pattern of the access device 102 and biometric information collected from the user 110. The user 110 can disable this feature or have to opt in to have their historical usage pattern and biometric information be obtained. The user 110 is in control of what type of information is going to be collected and aware of how that information is going to be used. In an embodiment, the user 110 is notified when the data collection of the user's 110 habit is being collected. In another example, the user 110 can easily select the use of the user's fingerprint but can dis-allow the use of the user's GPS or turn the user's microphone on.

Authentication module 142 updates the record associated with the user 110 based on the validation token. The record is associated with the user 102. The record can include a historical usage pattern of how the user 110 uses the access device 102. The record can also include identification information of the user 110. The validation token, for example, may include a password, a biometric scan, a key, a hidden path, a social barrier, or any other authentication method that may give the user 110 an access to the secure area 120 secured by the control device 106.

When the control device 106 receives the validation token, the control device 106 communicates the authentication module 142 and verifies the validation token received from the access device 102 matches the updated record associated with the user 110 in the authentication module 142. If the validation token matches the record associated with the user 110 in attempting to access the secure area 120, the control device 106 grants access to the user 110.

Control device 106 is to provide an access control for the user 110 to the secure area 120. The term access control refers to the practice of restricting entrance to a property, a building, or a room to authorized persons. Physical access control is a matter of who, where, and when. In an embodiment, control device 106 determines who can enter or exit, where they can exit or enter, and when they can enter or exit. An access control point to the secure area 120 can be a door, turnstile, parking gate, elevator, or other physical barrier, where granting access can be electronically secured by the control device 106.

In various embodiments of the present disclosure, the control device 106 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, the computing device 106 represents a computing system utilizing clustered computers and components to act as a single pool of seamless resources. In general, the control device 106 can be any computing device or a combination of devices with access to validation module 162 and network 108 and is capable of processing program instructions and executing validation module 162, in accordance with an embodiment of the present disclosure. The control device 106 may include internal and external hardware components, as depicted and described in further detail with respect to FIG. 4.

Further, in the depicted embodiment, control device 106 includes a validation module 162. The validation module 162 is configured to be able to receive a token from the access device 102 that requests an access to the secure area 120. Upon receiving the token, validation module 162 sends a request to the authentication module 142 in the computing device 104 to verify whether the token is a valid token to access the secure area 120. Subject to a successful verification of the token by the validation module 162 with the authentication module 142, control device 106 grants access to the user 110 with the access device 102.

In some embodiments, control device 106 requires that the access device 102 has been unlocked within a specified number of hours before allowing access to the secure area 120. In another embodiment, control device 106 requires that the access device 102 has been unlocked within a specified number of hours before allowing access to the secure area 120, plus a plurality of additional continuous authentication associated with the identification information from the user 110, for accessing the secure area 120. In yet another embodiment, control device 106 requires that the access device 102 has been unlocked within a specified number of hours before allowing access to the secure area 120, plus a plurality of additional continuous authentication associated with the identification information from the user 110, and additional real time scan of biometrics of the user 110, for accessing the secure area 120. In an embodiment, the validation module 162 in the control device 106 can create a confidence score based on the matching of the recent behavior against the patterns associated to the user 110. This confidence score can be also used in any of the examples above to increase the level of security. In one embodiment, the access control environment 100 can be paired with a corporate security software to increase the security of the system. The access control environment 100 may enforce the user 110 to use some level of authentication method or methods, exponentially increasing the security of the solution. The access control environment 100 can enforce corporate policies to physical security. In one embodiment, the access control environment 100 may work in collaboration with existing procedures by adding one or more layers into already established protocols, and thus further strengthen already existing protocols. For example, if a user 110 needs to gain access into a higher security area, adding additional security method to an existing method further strengthens the ability to confirm identity. If the user 110 is already required to provide, for example a retinal scan and then badge, usage of a mobile phone is an additional layer of security to aid in identification and authentication.

Figure 2:
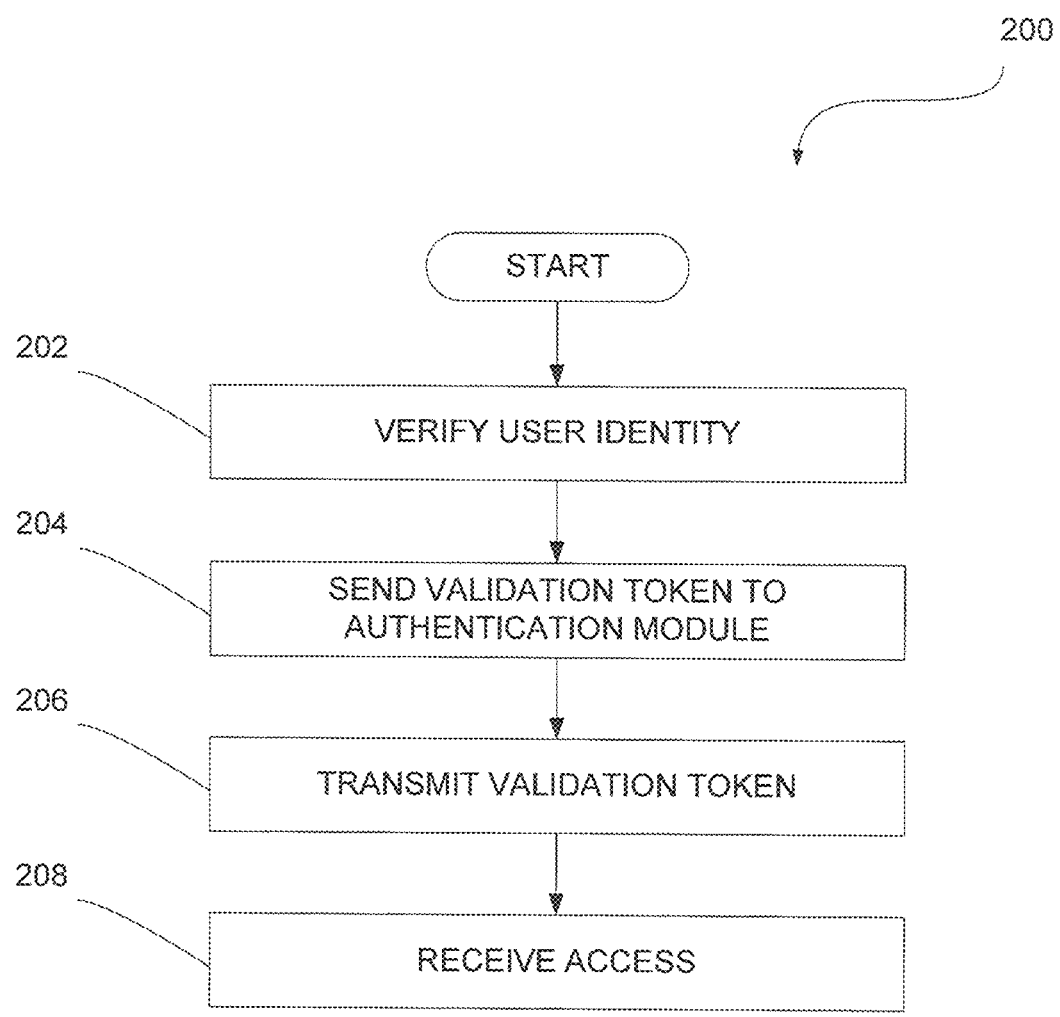
FIG. 2 is a flowchart depicting operational steps of an identification module within the access control environment of FIG. 1, in accordance with an embodiment of the present disclosure.

FIG. 2 is a flowchart 200 depicting operational steps of identification module 122 in accordance with an embodiment of the present disclosure.

Identification module 122 operates to receive identification information of the user 110. Identification module 122 also operates to verify an identity of the user 110 in specified time intervals based on the access device 102 respectively associated with the user 110. Identification module 122 further operates to send a validation token to an authentication module 142 and to transmit instructions to the authentication module 142 to update a record associated with the user 110 based on the validation token. In one embodiment, the authentication module 142 is a cloud-based system. In response to an attempt to access a secure area 120 secured by the control device 106, identification module 122 transmits the validation token to the control device 120. When the control device 106 receives the validation token, the control device 106 verifies the validation token received from the access device 102 matches the record associated with the user 110 in the authentication module 142.

In step 202 identification module 122 verifies an identity of the user 110 in specified time intervals based on the access device 102 respectively associated with the user 110. In an embodiment, identification module 122 receives identification information of the user 110 from the sensor 124. The identification information may be biometric information of the user 110. The biometric information may be physiological characteristic information. Physiological characteristic information is generally related to the shape of the user 110. The physiological characteristic information may include, but not limited to, fingerprint, signature dynamics, palm veins, face recognition, DNA, palm print, hand geometry, hand topography, iris recognition, retina, odor and scent. The biometric information may be behavioral characteristic information. Behavioral characteristic information is generally related to the pattern of behavior of the user 110. The behavioral characteristic information may include, but is not limited to, typing rhythm, typing pressure, keyboard dynamics, text habit, voice, walk gait, and global positioning system (GPS) commute path.

In an embodiment, the specified time intervals can be pre-determined or scheduled time intervals. In another embodiment, the specified time intervals can be time intervals based on the activities of the user 110 using the access device 102. Verifying the identity of the user 110 can be based on a historical usage pattern of the access device 102 and biometric information collected from the user 110. The user 110 can disable this feature or have to opt in to have their historical usage pattern and biometric information be obtained. The user 110 is in control of what type of information is going to be collected and aware of how that information is going to be used. In an embodiment, the user 110 is notified when the data collection of the user's 110 habit is being collected. In another example, the user 110 can easily select the use of the user's fingerprint but can disallow the use of the user's GPS or turn the user's microphone on.

In step 204 identification module 122 sends a validation token to authentication module 142 and transmits instructions to authentication module 142 to update a record associated with the user 110 based on the validation token. In one embodiment, the authentication module 142 is a cloud-based system. The validation token is based on the updated and verified identification information of the user 110 in specified time intervals. The validation token, for example, may include a password, a biometric scan, a key, a hidden path, a social barrier, or any other authentication method that may give the user 110 an access to the secure area 120 secured by the control device 106. The record in the authentication module 142 is associated with the user 102. The record can include a historical usage pattern of how the user 110 uses the access device 102. The record can also include identification information of the user 110. In an embodiment, the authentication module 142 is located on the computing device 104. In another embodiment, the authentication module 142 is located externally and accessed through a communication network such as network 108.

In step 206, in response to an attempt to access the secure area 120 secured by the control device 106, the identification module 122 transmits the validation token to the control device 120. In an embodiment, the identification module 122 transmits the validation token to the control device 120 through near field commination (NFC). In another embodiment, the identification module 122 transmits the validation token to the control device 120 through radio frequency communication. In another embodiment, the identification module 122 transmits the validation token to the control device 120 through network 108.

When the control device 106 receives the validation token, the control device 106 communicates the authentication module 142 and verifies the validation token received from the access device 102 matches the record associated with the user 110 in the authentication module 142.

In step 208, the identification module 122 verifies the validation token by the control device with the authentication module 142 in the computing device 104. In one embodiment, the authentication module 142 is a cloud-based system. The identification module 122 receives a permission from the control device 106 to access to the secure area 120 subject to verification of the validation token with the authentication module 142 when the validation token matches the record associated with the user 110 in attempting to access the secure area 120. Up to a successful verification of the validated token by the control device 106 with the authentication module 142, the control device 106 gives the user 110 an access to the secure area 120. If the authentication module 142 fails in verifying the validated token, the control device 106 may deny the user 110 to access the secure area 120.

Figure 3:
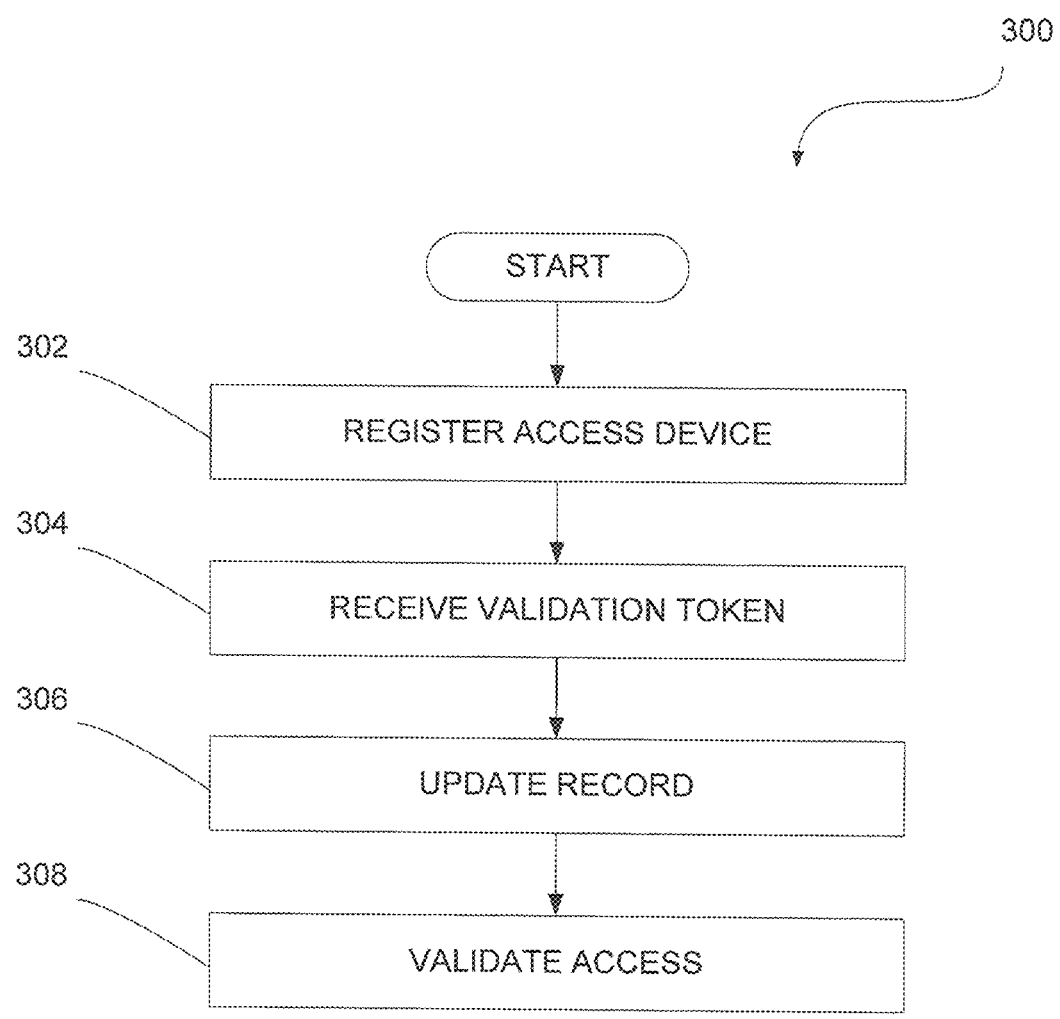
FIG. 3 is a flowchart depicting operational steps of an authentication module included in a computing device of FIG. 1, in accordance with an embodiment of the present disclosure.

FIG. 3 is a flowchart 300 depicting operational steps of authentication module 142 in accordance with one embodiment of the present disclosure.

Authentication module 142 operates to register the access device 102 associated with the user 110 for a record to access the secure area 120 secured by the second device 106. Authentication module 142 also operates to receive a validation token based on verification of an identity of the user 110 in specified time intervals from the access device 102. Authentication module 142 further operates to update the record associated with the user 110 based on the validation token. In response to an attempt to access the secure area 120, authentication module 142 operates to verify the validation token sent by the access device 102 to the control device 106 based on the updated record associated with the user 110.

In step 302 authentication module 142 registers the access device 102 associated with the user 110 for a record to access the secure area 120 secured by the second device 106. In one embodiment, authentication module 142 is a cloud-based system. The record is associated with the user 102. The record can include a historical usage pattern of how the user 110 uses the access device 102. The record can also include identification information of the user 110.

In step 304 authentication module 142 receives a validation token in specified time intervals based on verification of an identity of the user 110 from the access device 102. In an embodiment, the specified time intervals can be pre-determined or scheduled time intervals. In another embodiment, the specified time intervals can be time intervals based on the activities of the user 110 using the access device 102. Verifying the identity of the user 110 can be based on a historical usage pattern of the access device 102 and biometric information collected from the user 110. The user 110 can disable this feature or have to opt in to have their historical usage pattern and biometric information be obtained. The user 110 is in control of what type of information is going to be collected and aware of how that information is going to be used. In an embodiment, the user 110 is notified when the data collection of the user's 110 habit is being collected. In another example, the user 110 can easily select the use of the user's fingerprint but can disallow the use of the user's GPS or turn the user's microphone on. The identification information is detected by the access device 102 used by the user 110. The identification information may include, but not limited to, fingerprint, signature dynamics, palm veins, face recognition, DNA, palm print, hand geometry, handy topography, iris recognition, retina, odor, scent, typing rhythm, typing pressure, keyboard dynamics, text habit, voice, walk gait, and GPS commute path. The validation token is used to give the user 110 access to the secure area 120 that is secured by the control device 106. The validation token, for example, may include a password, a biometric scan, a key, a hidden path, a social barrier, or any other authentication method that may give the user 110 an access to the secure area 120 secured by the control device 106.

In step 306 authentication module 142 updates the record associated with the user 110 based on the validation token in specified time intervals based on verification of the identity of the user 110 from the access device 102. The record is associated with the user 102. The record can include a historical usage pattern of how the user 110 uses the access device 102. The record can also include identification information of the user 110. The validation token, for example, may include a password, a biometric scan, a key, a hidden path, a social barrier, or any other authentication method that may give the user 110 an access to the secure area 120 secured by the control device 106.

In step 308 in response to an attempt to access the secure area, authentication module 142 operates to verify the validation token sent by the access device 102 to the control device 106 based on the updated record associated with the user 110. When the control device 106 receives the validation token, the control device 106 communicates the authentication module 142 and verifies the validation token received from the access device 102 matches the updated record associated with the user 110 in the authentication module 142. If the validation token matches the record associated with the user 110 in attempting to access the secure area 120, the control device 106 grants access to the user 110.

Figure 4:
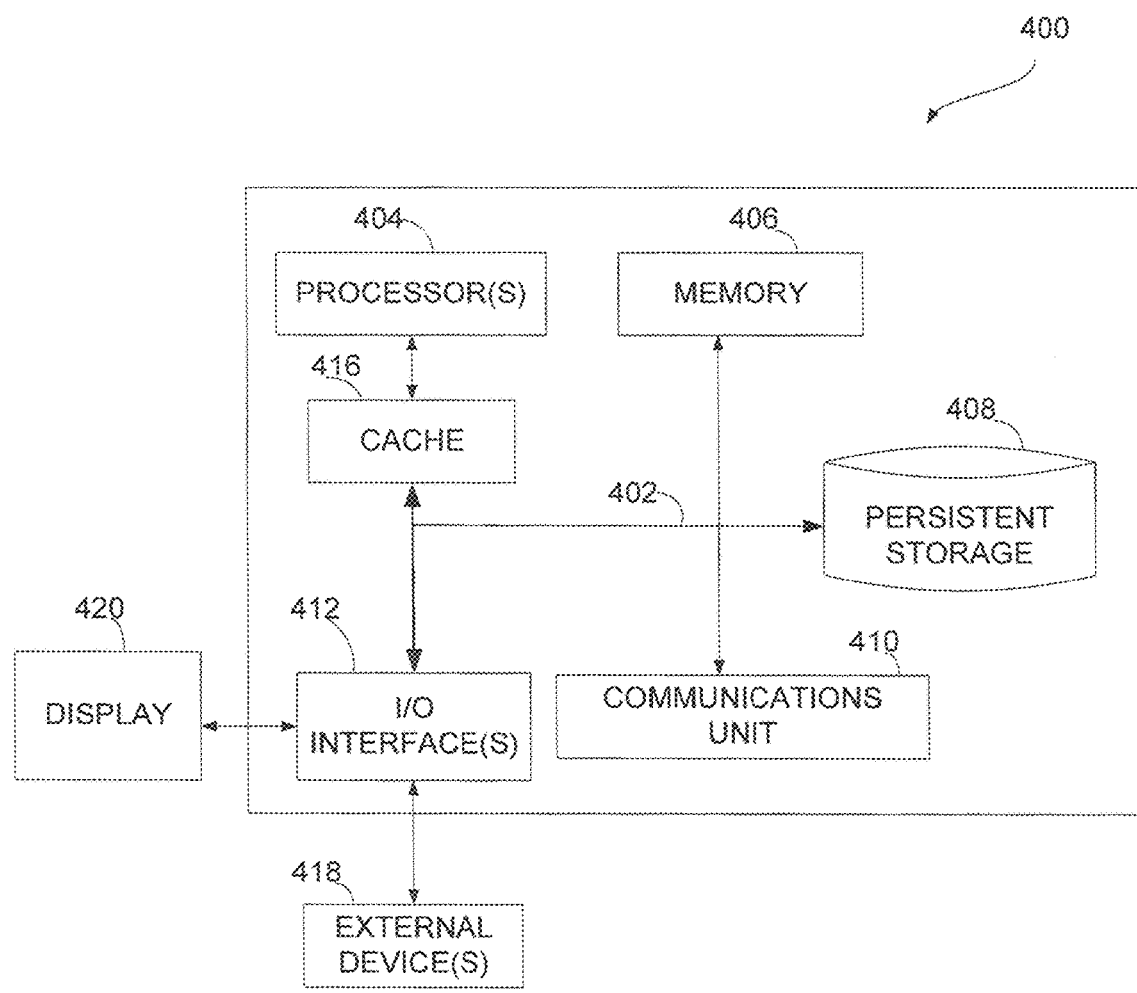
FIG. 4 is a block diagram of components of the access device, the computing device, and the control device of FIG. 1, in accordance with an embodiment of the present disclosure.

FIG. 4 depicts a block diagram 400 of components of each of access device 102, computing device 104, and control device 106 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Access device 102, computing device 104, and control device 106 each may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Identification module 122, authentication module 142, and validation module 162 each may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Identification module 122, authentication module 142, and validation module 162 each may be downloaded to persistent storage 408 through communications unit 410.

I/O interface(s) 412 allows for input and output of data with other devices that may be connected to access device 102, computing device 104, and/or control device 106. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., identification module 122, authentication module 142, and validation module 162 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
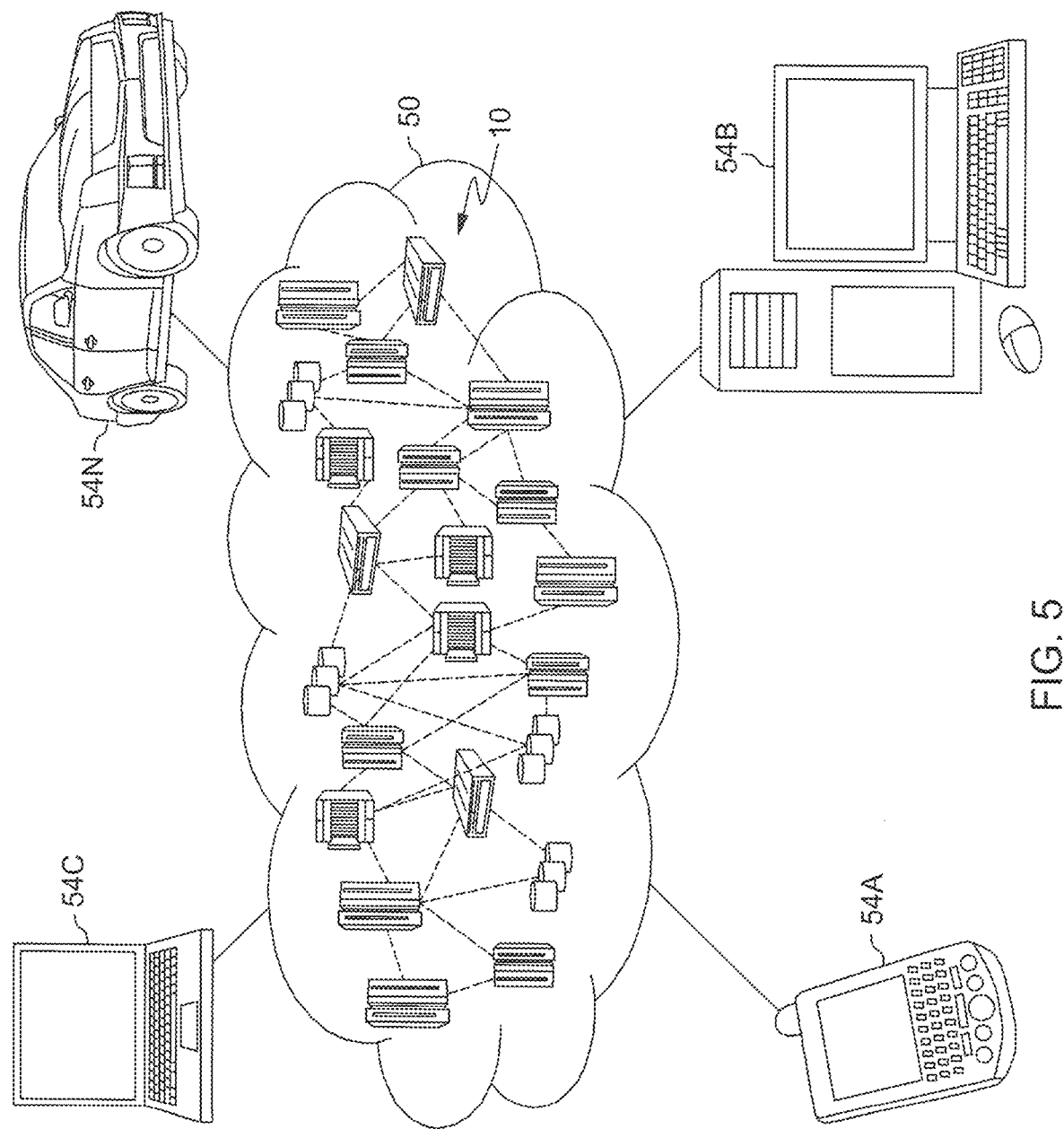
FIG. 5 depicts an embodiment of a cloud computing environment in accordance with the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
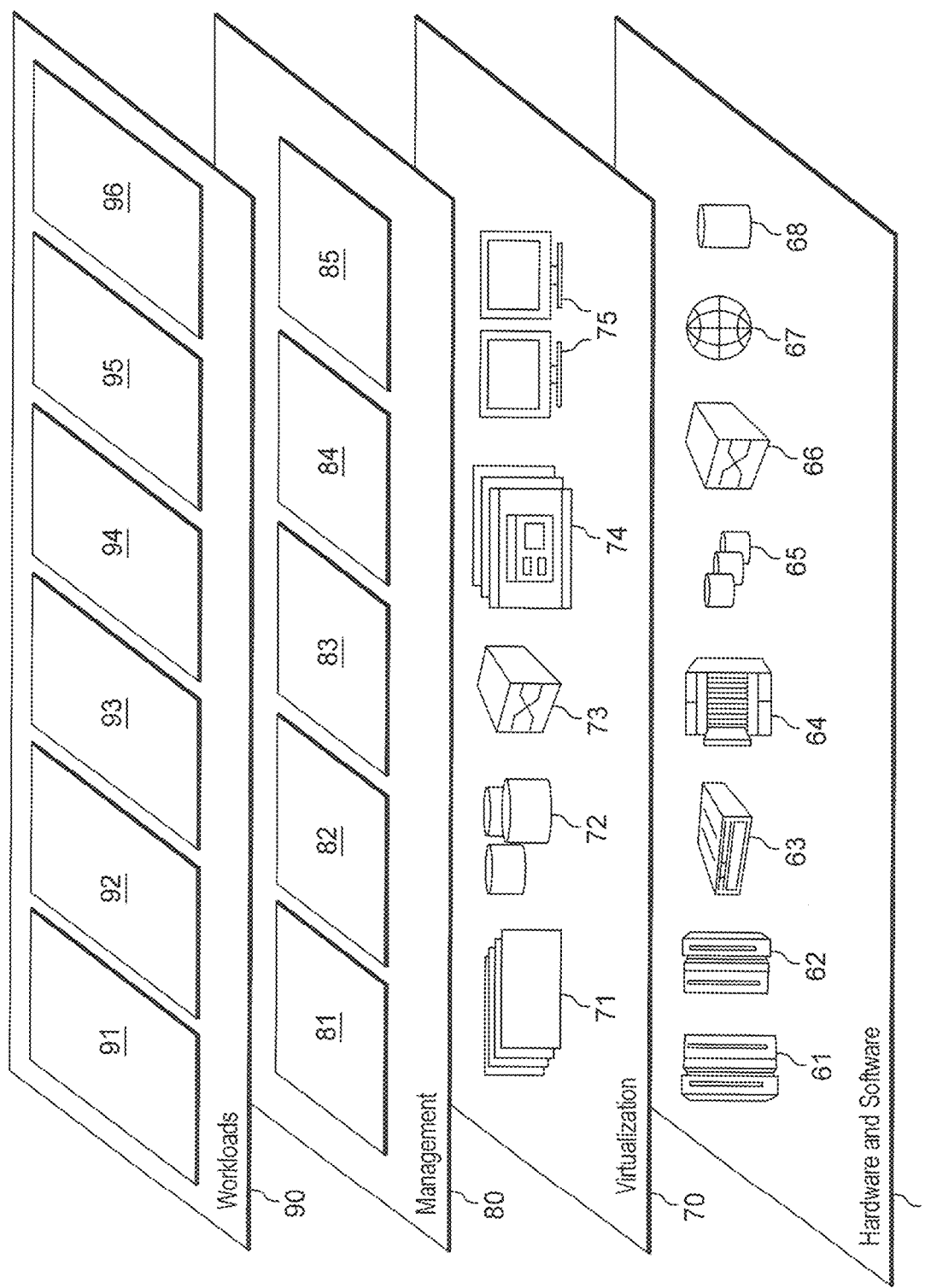
FIG. 6 depicts an embodiment of abstraction model layers of a cloud computing environment, in accordance with the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, identification module 122, authentication module 142, and or validation module 162 as describe above with respect to the access control environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   verifying, by one or more processors, an identity of a user in specified time intervals based on a first device associated with the user, wherein the specified time intervals are time intervals based on activities of the user using the first device, wherein verifying the identity of the user is based on a historical usage pattern of the first device by the user and biometric information collected from the user;
   sending, by one or more processors, a validation token to a cloud-based system, wherein sending the validation token includes transmitting an instruction to the cloud-based system to update a record associated with the user based on the validation token, the validation token based on the updated and verified identification information of the user in the specified time interval;
   registering, by one or more processors, the first device associated with the user with the cloud-based system for the record associated with the user to access a secure area secured by a second device, the record including the historical usage pattern and identification information of the user, the historical usage pattern including a typing rhythm, a typing pressure, and a keyboard dynamic of the user, the biometric information including a signature dynamic of the user;
   updating, by one or more processors, the record associated with the user in the cloud-based system, wherein the record includes the historical usage pattern of how the user uses the first device;
   in response to an attempt to access the secure area, transmitting, by one or more processors, the validation token to the second device; and
   receiving, by one or more processors, a permission from the second device to access to the secure area subject to verification of the validation token when the validation token matches the updated record associated with the user.

2. The method of claim 1, wherein the historical usage pattern is selected from the group consisting of: typing rhythm, typing pressure, keyboard dynamics, text habit, walk gait, and global positioning system commute path.

3. The method of claim 1, wherein the biometric information is selected from the group consisting of: fingerprint, signature dynamics, palm veins, face recognition, DNA, palm print, hand geometry, hand topography, iris recognition, retina, odor and scent.

4. A computer program product for an access control system, the computer program product comprising:
   one or more computer readable storage media and program instructions stored on the one or more computer readable storage media, the program instructions comprising:
   program instructions to verify an identity of a user in specified time intervals based on a first device associated with the user, wherein the specified time intervals are time intervals based on activities of the user using the first device, wherein program instructions to verify the identity of the user are based on a usage pattern of the first device by the user and biometric information collected from the user, wherein the historical usage pattern is selected from the group consisting of: typing rhythm, typing pressure, keyboard dynamics, text habit, walk gait, and global positioning system commute path, wherein the biometric information is selected from the group consisting of: fingerprint, signature dynamics, palm veins, face recognition, DNA, palm print, hand geometry, hand topography, iris recognition, retina, odor and scent;

program instructions to send a validation token to a cloud-based system, wherein program instructions to send the validation token includes program instructions to transmit an instruction to the cloud-based system to update a record associated with the user based on the validation token, the validation token based on the updated and verified identification information of the user in the specified time interval;

program instructions to register the first device associated with the user with the cloud-based system for the record associated with the user to access a secure area secured by a second device, the record including the historical usage pattern and identification information of the user, the historical usage pattern including a typing rhythm, a typing pressure, and a keyboard dynamic of the user, the biometric information including a signature dynamic of the user;

program instructions to update the record associated with the user in the cloud-based system, wherein the record includes the historical usage pattern of how the user uses the first device;

program instructions to, in response to an attempt to access the secure area, transmit the validation token to the second device; and program instructions to receive a permission from the second device to access to the secure area subject to verification of the validation token when the validation token matches the updated record associated with the user.

5. The computer program product of claim 4, wherein the historical usage pattern is selected from the group consisting of: typing rhythm, typing pressure, keyboard dynamics, text habit, walk gait, and global positioning system commute path.

6. The computer program product of claim 4, wherein the biometric information is selected from the group consisting of: fingerprint, signature dynamics, palm veins, face recognition, DNA, palm print, hand geometry, hand topography, iris recognition, retina, odor and scent.

7. A computer system for an access control system, the computer system comprising:

one or more computer processors, one or more computer readable storage media, and program instructions stored on the computer readable storage media for execution by at least one of the one or more processors, the program instructions comprising:

program instructions to verify an identity of a user in specified time intervals based on a first device associated with the user, wherein the specified time intervals are time intervals based on activities of the user using the first device, wherein program instructions to verify the identity of the user are based on a usage pattern of the first device by the user and biometric information collected from the user;

program instructions to send a validation token to a cloud-based system, wherein program instructions to send the validation token includes program instructions to transmit an instruction to the cloud-based system to update a record associated with the user based on the validation token, the validation token based on the updated and verified identification information of the user in the specified time interval;

program instructions to register the first device associated with the user with the cloud-based system for the record associated with the user to access a secure area secured by a second device, the record including the historical usage pattern and identification information of the user, the historical usage pattern including a typing rhythm, a typing pressure, and a keyboard dynamic of the user, the biometric information including a signature dynamic of the user;

program instructions to update the record associated with the user in the cloud-based system, wherein the record includes the historical usage pattern of how the user uses the first device;

program instructions to, in response to an attempt to access the secure area, transmit the validation token to the second device; and program instructions to receive a permission from the second device to access to the secure area subject to verification of the validation token when the validation token matches the updated record associated with the user.

8. The computer system of claim 7, wherein the historical usage pattern is selected from the group consisting of: typing rhythm, typing pressure, keyboard dynamics, text habit, walk gait, and global positioning system commute path.

\* \* \* \* \*